US008218398B2

(12) United States Patent
Graber

(10) Patent No.: US 8,218,398 B2
(45) Date of Patent: Jul. 10, 2012

(54) OMNI-DIRECTIONAL RADIATOR FOR MULTI-TRANSDUCER ARRAY

(76) Inventor: Curtis E. Graber, Woodburn, IN (US)

( * ) Notice: Subject to any disclaimer, the term of this patent is extended or adjusted under 35 U.S.C. 154(b) by 344 days.

(21) Appl. No.: 12/590,182

(22) Filed: Nov. 4, 2009

(65) Prior Publication Data

US 2010/0119090 A1 May 13, 2010

Related U.S. Application Data

(60) Provisional application No. 61/199,030, filed on Nov. 12, 2008.

(51) Int. Cl.
*H04B 11/00* (2006.01)
*H04R 25/00* (2006.01)

(52) U.S. Cl. ......... 367/133; 367/131; 367/153; 381/182

(58) Field of Classification Search .................. 367/133, 367/153; 381/182
See application file for complete search history.

(56) References Cited

U.S. PATENT DOCUMENTS 3,882,444 A 5/1975 Robertson
3,978,940 A 9/1976 Bouyoucos
4,695,987 A 9/1987 Bouyoucos
5,900,593 A * 5/1999 Adamson ...................... 181/152
6,050,361 A 4/2000 Ruffa et al.
6,361,747 B1 3/2002 Dion et al.
6,493,894 B1 12/2002 Whiteside et al.
6,704,247 B1 3/2004 Ruffa
2001/0050144 A1* 12/2001 Nishikawa et al. ........... 156/345
2002/0014368 A1* 2/2002 Adamson ...................... 181/182
2003/0103012 A1* 6/2003 Navarro ........................ 343/772
2003/0150561 A1* 8/2003 Ishii et al. ................ 156/345.41
2003/0176816 A1* 9/2003 Maguire et al. ................... 601/2
2004/0105559 A1* 6/2004 Aylward et al. ............... 381/103
2004/0170369 A1* 9/2004 Pons ............................. 385/135
2005/0047622 A1 3/2005 Graber
2005/0226588 A1* 10/2005 Pons ............................. 385/135
2006/0285712 A1* 12/2006 Butler ........................... 381/340
2007/0201711 A1* 8/2007 Meyer et al. .................. 381/182
2007/0269071 A1* 11/2007 Hooley .......................... 381/336
2009/0238383 A1* 9/2009 Meyer et al. .................. 381/182

FOREIGN PATENT DOCUMENTS

WO WO 2006/016156 2/2006

OTHER PUBLICATIONS

Skobelev, S.P.; Soon Young Eom; Han Kyu Park; , "Shaping of flat-topped element patterns in a planar array of circular waveguides using a multilayered disk structure. I. Theory and numerical modeling," Antennas and Propagation, IEEE Transactions on , vol. 51, No. 5, pp. 1040-1047, May 2003.*
Kuntsal, E.; , "Free-flooded ring transducers: design methods and their interaction in vertical arrays," OCEANS 2003. Proceedings , vol. 4, No., pp. 2074-2078 vol. 4, Sep. 22-26, 2003.*
Coates, R.F.W.; , "The design of transducers and arrays for underwater data transmission," Oceanic Engineering, IEEE Journal of , vol. 16, No. 1, pp. 123-135, Jan. 1991.*

* cited by examiner

*Primary Examiner* — Thomas Tarcza
*Assistant Examiner* — James Hulka
(74) *Attorney, Agent, or Firm* — Paul W. O'Malley; Susan L. Firestone

(57) ABSTRACT

An omni-directional acoustic horn for applications in a liquid transmission medium deploys a plurality of transducers distributed along an interior face of the horn to radiate against an opposed surface. The arrangement mimics operation at a greater depth of submergence to depress development of acoustic cavitation bubbles.

16 Claims, 11 Drawing Sheets

OMNI-DIRECTIONAL RADIATOR FOR MULTI-TRANSDUCER ARRAY

PRIORITY CLAIM

This application claims priority based on U.S. Provisional Patent Application No. 61/199,030 filed Nov. 12, 2008.

BACKGROUND

1. Technical Field

The disclosure relates to transducer arrays for producing sound, and more particularly to a high power sound source for use in liquids.

2. Description of the Problem

Sound is a disturbance in the physical properties of an elastic material/medium that propagates through the material. The disturbed physical properties can be the alternation in pressure, the displacement of particles or a change in the density of the elastic material/medium. An acoustic pressure wave will have alternating zones of high and low pressure, which can be referred to as the compression and rarefaction waves. An acoustic pressure wave propagating through a liquid (and possibly through a solid) medium can produce phase changes and otherwise affect physical properties of the liquid medium due to changing pressure. Pressure drops in a liquid medium can result in the liquid medium itself turning to vapor, gasses dissolved in the liquid leaving solution, or both. In other words, bubbles can be produced. These bubbles are termed acoustic cavitation bubbles. Usually acoustic cavitation bubbles rapidly collapse, which in turn can produce intense shock waves.

Whether acoustic cavitation bubbles are a problem in a given situation depends upon the system. For example, in systems where the pressure variation is highest at the surfaces of the transducers acoustic cavitation bubbles occur along these surfaces and their occurrence decreases rapidly with increasing distance from the surface of the transducer. In such systems the transducer surfaces are vulnerable to damage from acoustic cavitation.

The acoustic cavitation phenomenon can also limit the amount of power that can be transferred from the transducer element(s) to the propagating medium and distort the resulting signal. A cavitation resistant array was proposed in U.S. Pat. No. 6,050,361 in which interstices of the sonar array between transducers was designed to match the specific acoustic impedance of water.

SUMMARY

An omni-directional acoustic radiator provides are arcuate waveguide, which may be extended through a full circle to form a toroidal waveguide. A full toroidal waveguide includes two facing interior surfaces forming boundaries. Acoustic transducers are arranged in a constellation along one of the interior surfaces of a waveguide and face the opposed surface. The transducers are oriented to direct sound into a substantially opposed surface or boundary. The interior surface and the boundary extend outwardly from a central base or core of the waveguide and terminate at a mouth. Pressure waves propagating outwardly in the waveguide may be reinforced along a portion or substantially the full depth waveguide, including being summed in a cumulative or cascade manner, with operation of outer transducers (that is transducers closer to the mouth) being delayed and phase compensated to achieve coherent reinforcement of the pressure wave as it propagates outwardly from the core or central base. An arcuate or toroidal waveguide may be divided into channels by the use of interior radial baffles to increase output amplitude.

Additional effects, features and advantages will be apparent in the written description that follows.

BRIEF DESCRIPTION OF THE DRAWINGS

The contribution to the art believed novel is set forth in the appended claims. The preferred mode of use will best be understood by reference to the following detailed description of an illustrative embodiment when read in conjunction with the accompanying drawings, wherein:

DETAILED DESCRIPTION OF PREFERRED EMBODIMENTS

Figure 1:
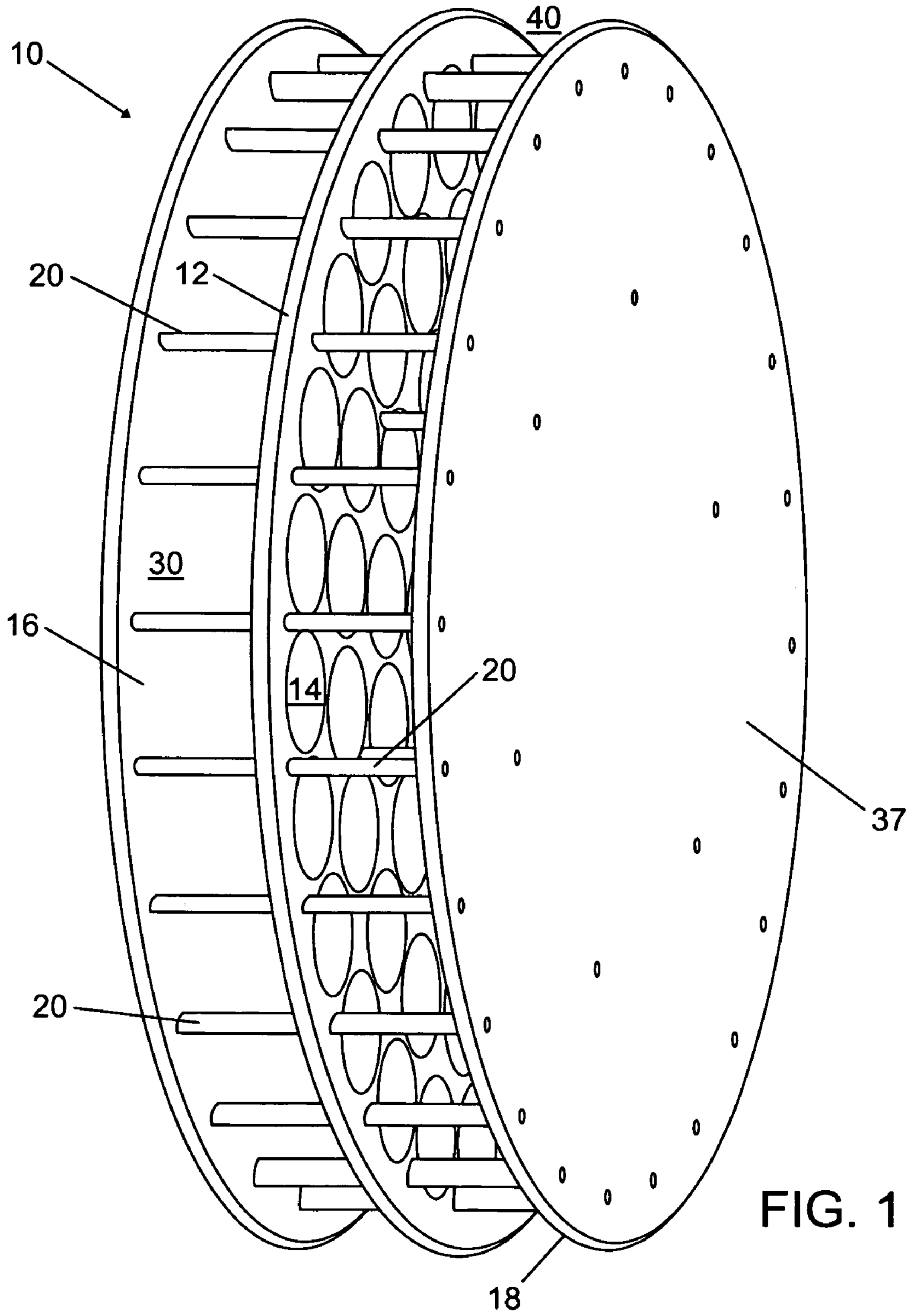
FIG. 1 is a perspective view of an omni-directional acoustic radiator in accord with one embodiment of the invention.
Figure 2:
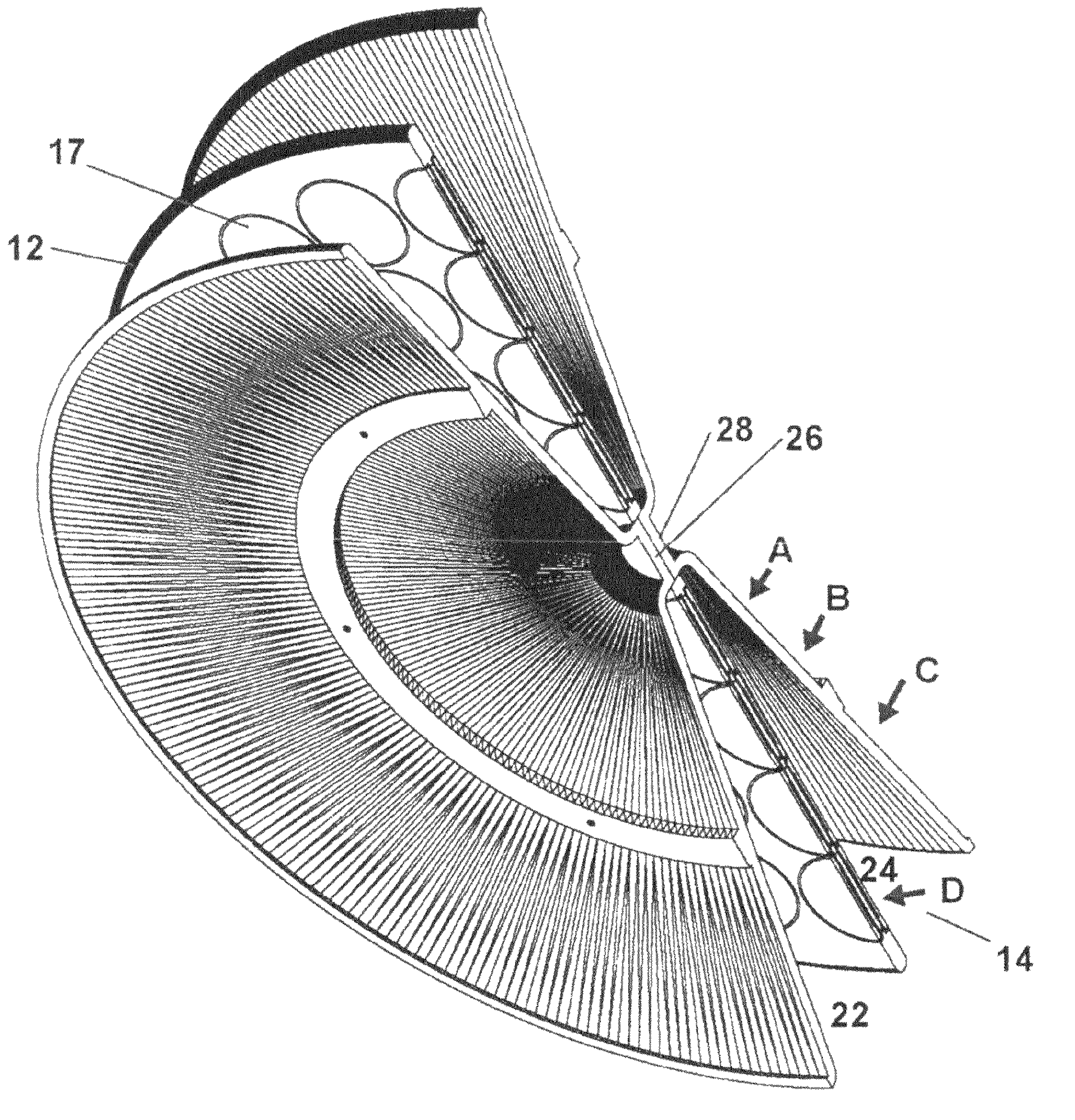
FIG. 2 is an isometric view of a sectioned omni-directional acoustic radiator.
Figure 3:
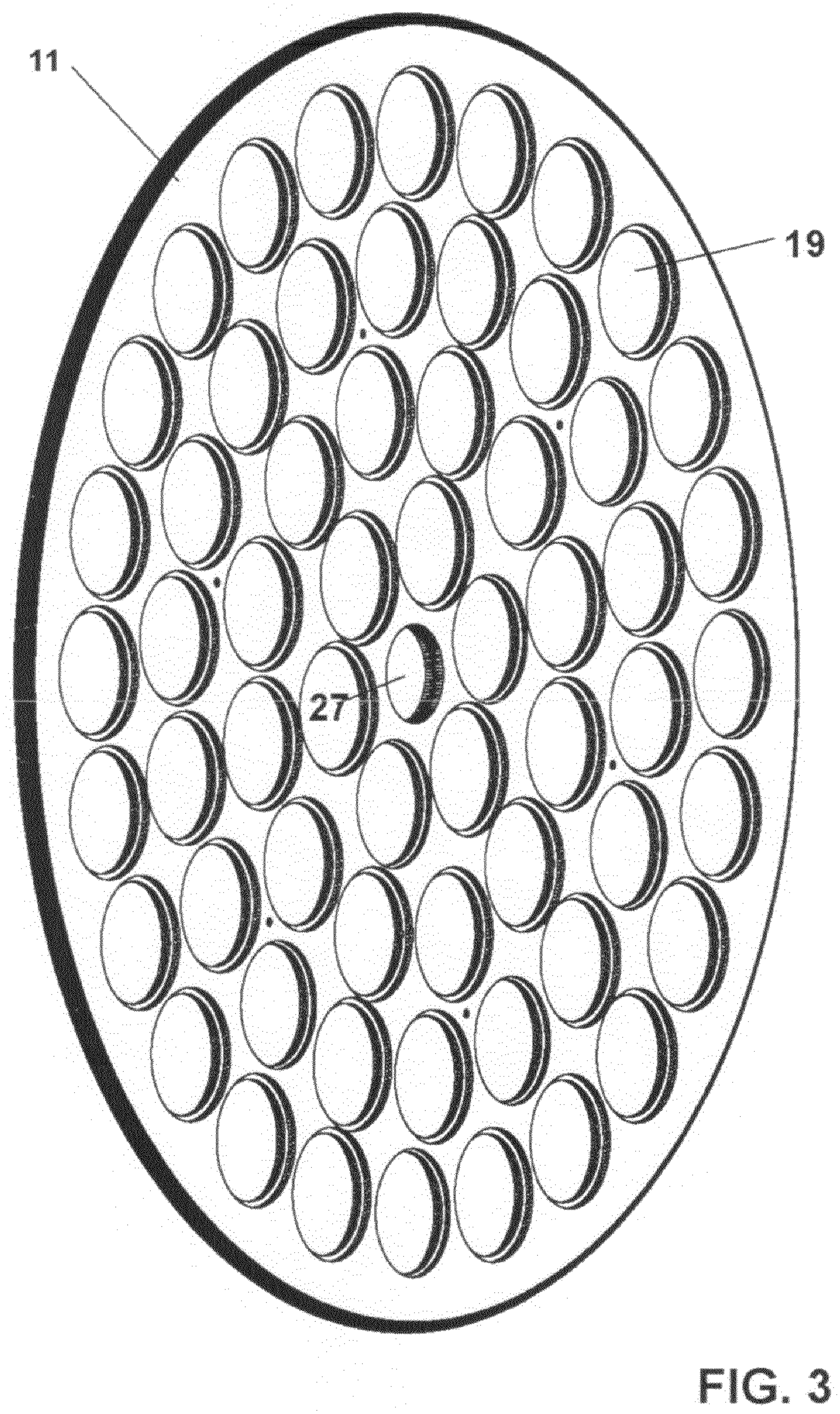
FIG. 3 is a perspective view of an disk baffle for the omni-directional acoustic radiator of FIG. 1.

Referring now to the drawings and more particularly to FIGS. 1-2, an acoustic radiator 10 is shown. Acoustic radiator 10 may be employed to radiate sound in a liquid medium, typically fresh or sea water and can operate through a full 360-degree arc in a plane and while exhibiting minimal vertical spread over a wide operational spectrum. In an omni-directional embodiment the acoustic radiator 10 comprises a pair of toroidal waveguides 22, 24. Toroidal waveguides 22, 24 are disposed back to back and radiate in parallel. Toroidal waveguide 22 is formed between disk baffle 12 and half shell 16. Toroidal waveguide 24 is formed between disk baffle 12 and half shell 18. Toroidal waveguides 22, 24 have a disk baffle 12 in common. Toroidal waveguides 22, 24 have circular, full circumference mouths 30, 40. A face plate 37 is shown in FIG. 1 and covers a depression in the relative exterior surface of shell 18.

Toroidal waveguides 22, 24 resemble horns in some functions. Horns are conventionally employed as acoustic transformers in low impedance transmission mediums, such as air. In air a horn increases the efficiency of coupling energy from a transducer/driver to the air by constraining expansion of the air in response to transducer movement in the vicinity of the transducer. The containment functionality they provide has some application in a liquid transmission medium. Efficiency in coupling energy from a solid transducer to most liquids is much higher than it is for a gas hence the transformer function of the horn is of little consequence in a liquid medium. However, by constraining displacement of liquid medium the phenomenon of the sound wave producing a change in phase of the medium is depressed by mimicking operation of the device at a greater depth of submergence. Toroidal waveguides 22 and 24 provide a step up in pressure allowing for the cascade reinforcement of a sound wave as it propagates from the respective central bases 26, 28 of the toroidal waveguides toward emission from mouths 30, 40 while suppressing the generation of acoustic cavitation bubbles during propagation and reinforcement of the rarefaction wave. The distance from the central bases 26, 28 to the mouths 30, 40 may be referred to as the radius or depth of the toroidal waveguides 22, 24. In essence, it appears the device is operating at a simulated greater submergence in the liquid medium. Toroidal waveguides 22, 24 also enhance the low frequency range of the omni-directional acoustic radiator 10.

Disk baffle 12 is based on a disk template 11. The disk template is perforated in a number of locations 19 for the inclusion of disk shaped piezoelectric transducers 17 and exhibiting a central aperture 27 though which central bases 26, 28 of the half shells 16, 18 can be joined to form a central core. Half shells 16 and 18 are generally round, but form sloped, shallow, bowl like structures on the major surface of the half shells remote to the disk baffle 12. The opposite major surfaces of the half shells 16 and 18, that is, the interior surfaces facing the major surfaces of disk baffle 12, form acoustic boundaries and cooperate with the disk baffle 12 to direct sound outwardly from the central bases 26, 28. The interior surfaces of half shells 16 and 18 exhibit an increasing gap from the disk baffle 12 with increasing distance from the central core formed by central bases 26, 28. When assembled an omni-directional horn-like structure is provided between one of the major faces of disk baffle 12 and a facing surface of one of half shells 16 or 18 to form one of two parallel 360° mouths 30, 40. The arcuate mouths 30, 40 radiate sound propagated from arcuate waveguides formed between the facing surfaces.

Disk baffle 12 and half shells 16 and 18 may be fabricated in cast in aluminum alloy and polished. However, such an aluminum structure may ring when used. In order to dampen ringing, dampening elements 20 may be lodged between disk baffle 12 and the respective half shells 16, 18.

Figure 6:
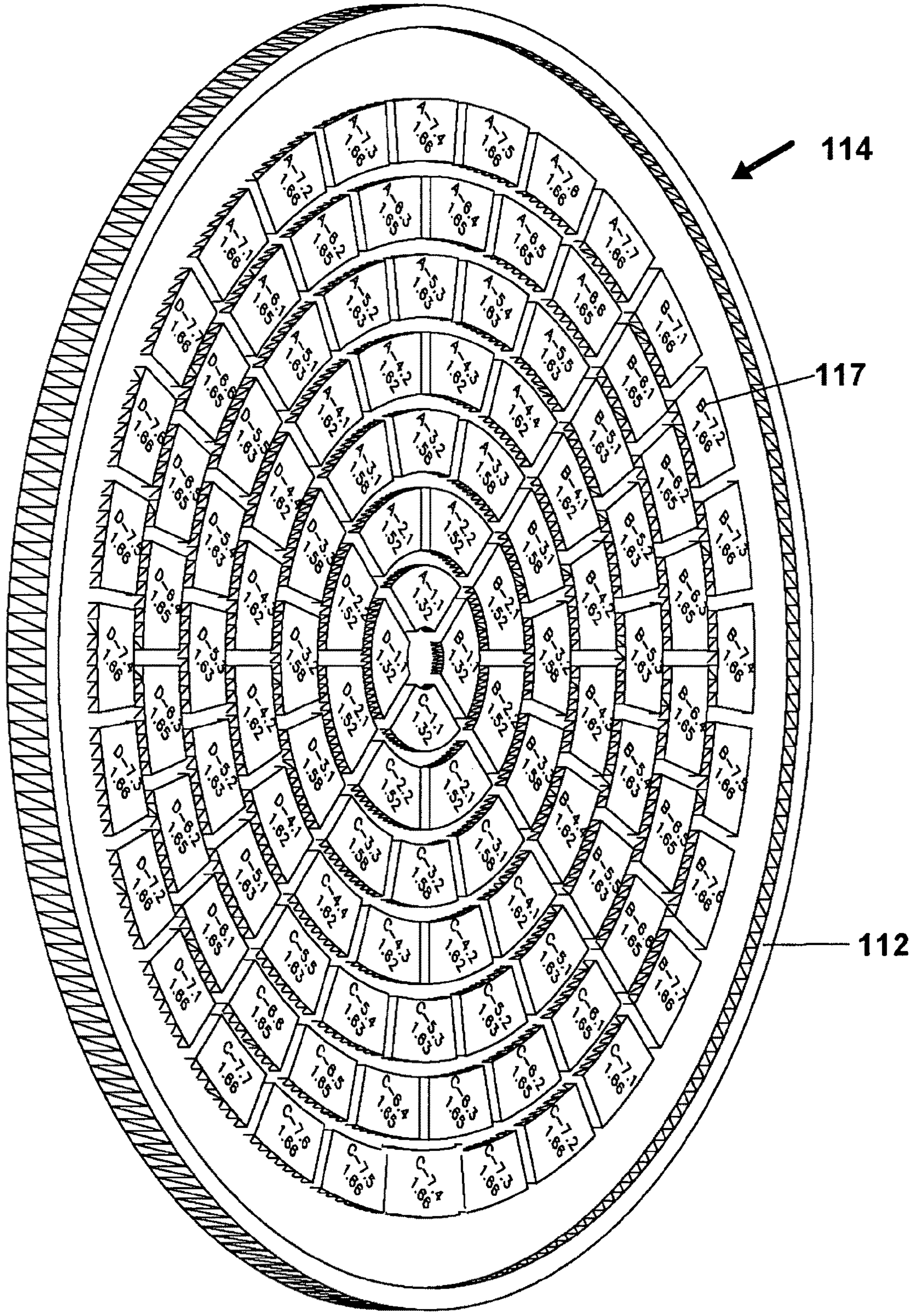
FIG. 6 is a perspective view of an alternative disk baffle.

Omni-directional radiator 10 incorporates a pair of multi-transducer arrays 14, which in one embodiment is formed from a constellation of four concentric circular sub-arrays (A, B, C and D) of piezoelectric acoustic transducers 17 mounted through baffle 12 at locations 19. Piezoelectric acoustic transducers 17 have opposed faces which operate in phase with one another. Baffle 12 provides one of the two surfaces for each of toroidal waveguides 22, 24, and the transducers are to be mounted so that each of their two active faces is flush with one of the major surfaces of the baffle 12. FIG. 2 depicts one possible interior arrangement for the transducers. However, actual devices could be cut in a similar manner to be fitted against the side of a ship or other underwater structure. In other words, the double disk arrangement could be cut in half, or quartered, etc., and a boundary disposed along the exposed interior portion to produce a sound projecting apparatus for a confined angle in a plane as illustrated in FIG. 6 where a "directional" radiator 11 includes a backing 13 which confines the radial extent of the device to half a circle.

Piezoelectric acoustic transducers 17 are conventionally provided as circular disks, though such a shape is not necessarily the best one. Toroidal waveguides propagate sound waves initiated near the central cores 26, 28 outwardly to mouths 30 and 40 while at least maintaining the amplitude of the wave as it expands circumferentially within the radiators. To obtain that result it is intended that an acoustic wave propagating outwardly in the toroidal waveguides 22, 24 be maintained at a constant or increasing pressure notwithstanding the increasing area of the wave front as it moves from the central cores to the mouths 30, 40.

Each successive sub-array (B, C, D) of transducers 17 after the first sub-array A should add enough energy, synchronized with the wave, to at least maintain the acoustic wave's amplitude notwithstanding the expanding circumference of the wave front. Greater efficiency is obtained if energy is added continuously as the wave propagated outwardly. This objective would be best served by making the transducers as small as possible, at least in the directions moving radially outwardly from the central cores 26, 28. Ideal transducers would be circular ribbons of minimal width and successively greater diameters, centered on the central cores 26, 28 and essentially blanketing the available surface of the baffle 12. The brake shoe shaped transducers of FIG. 6 mimic this arrangement.

Figure 5A:
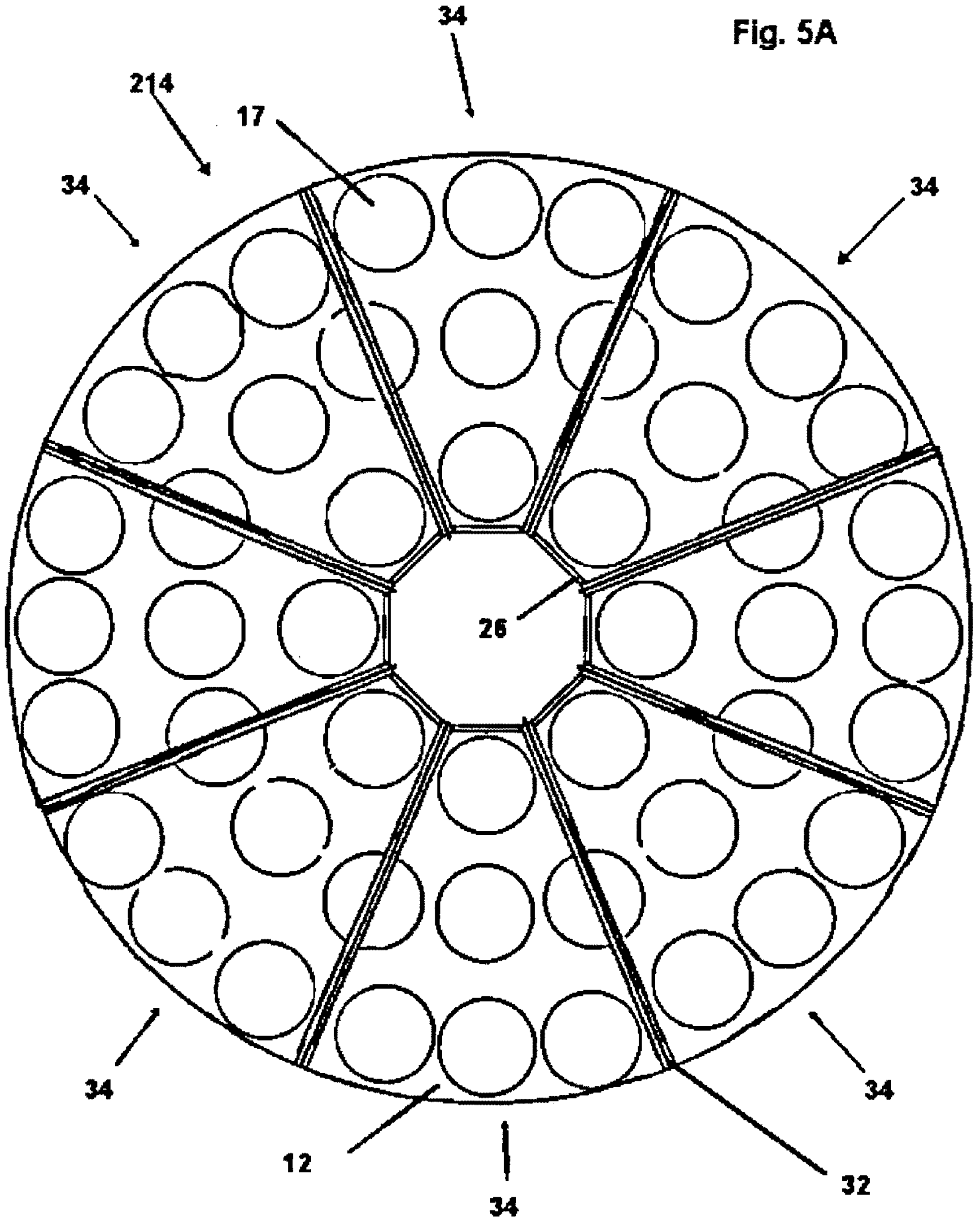
FIGS. 5A-C are top plan views of disk baffles having carrying different possible multi-transducer arrays.
Figure 5B:
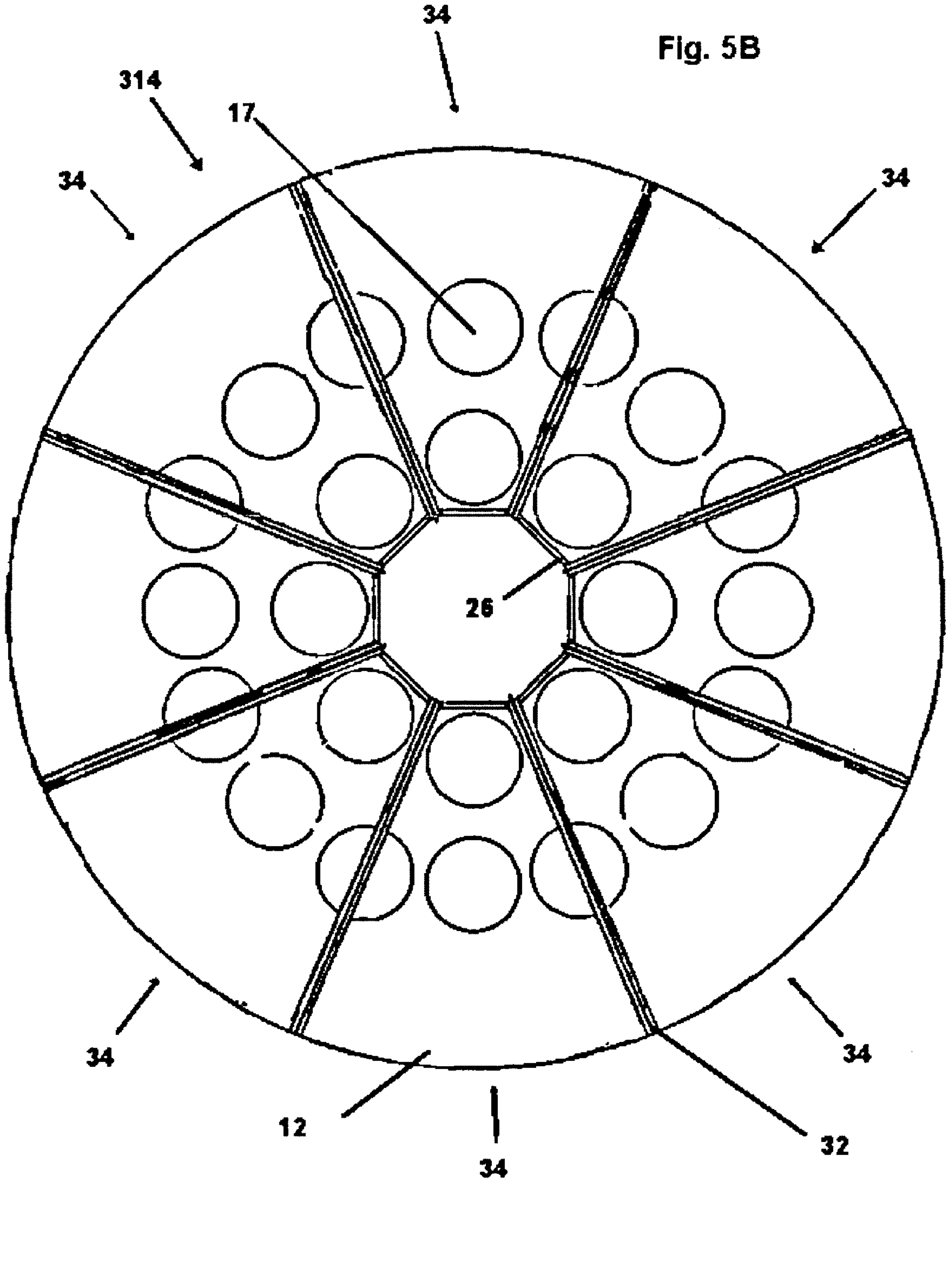
Figure 5C:
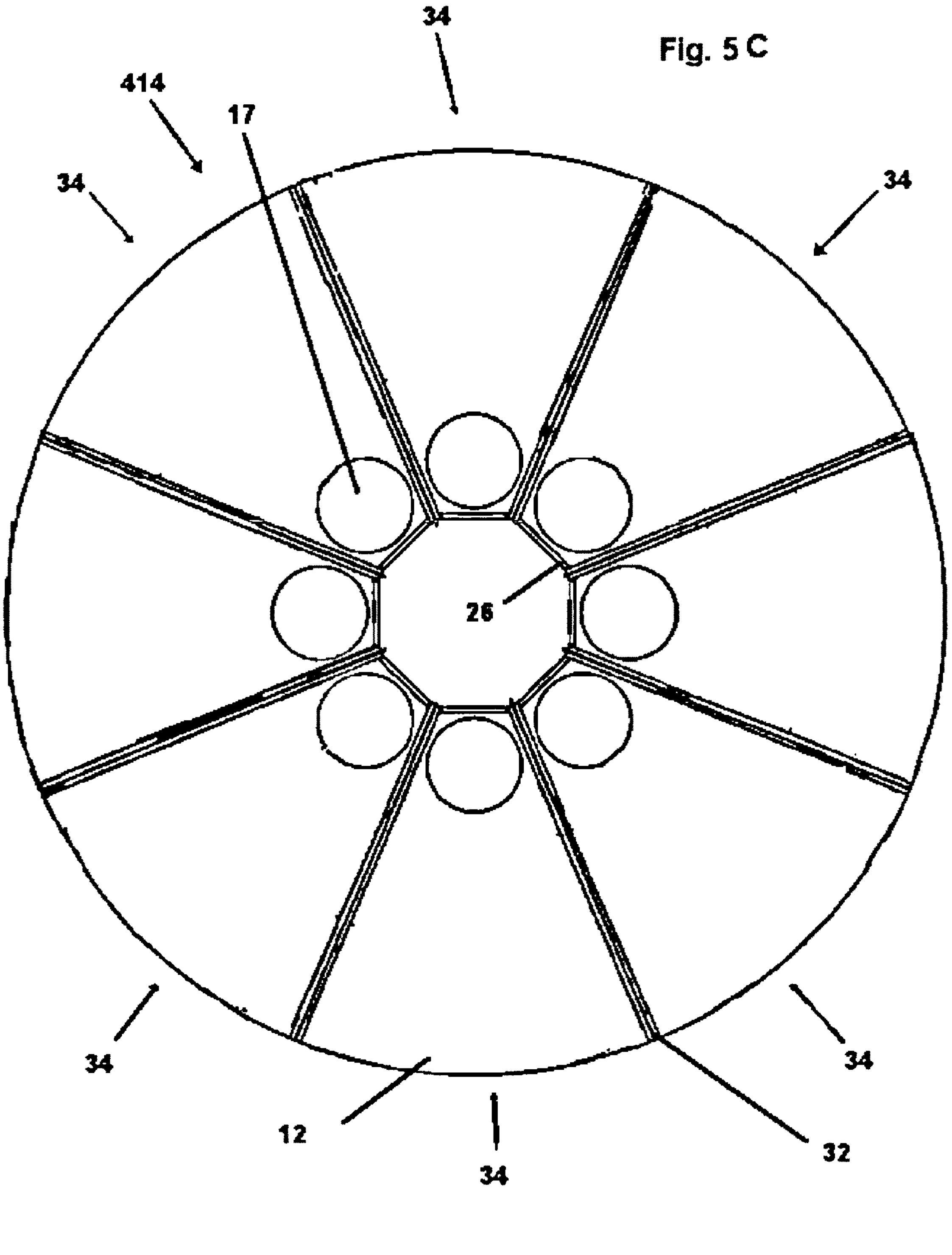

Prototype embodiments of an omni-directional acoustic radiator 10 employing four rings A-D in the multi-transducer array 14 of transducers 17 indicated that the transducers 17 in the inner rings A and B contributed almost all of the gain in amplitude of the wave front while ring C contributed a much smaller amount of additional amplitude and ring D contributed virtually none. However, operation of the outer rings C and D did expand the band width of the omni-directional acoustic radiator 10 in the low frequency range. FIGS. 5A-C illustrate alternative constellations of multi-transducer arrays 214, 314, 414 providing three rings, two rings and one ring of transducers 17, respectively.

Figure 4:
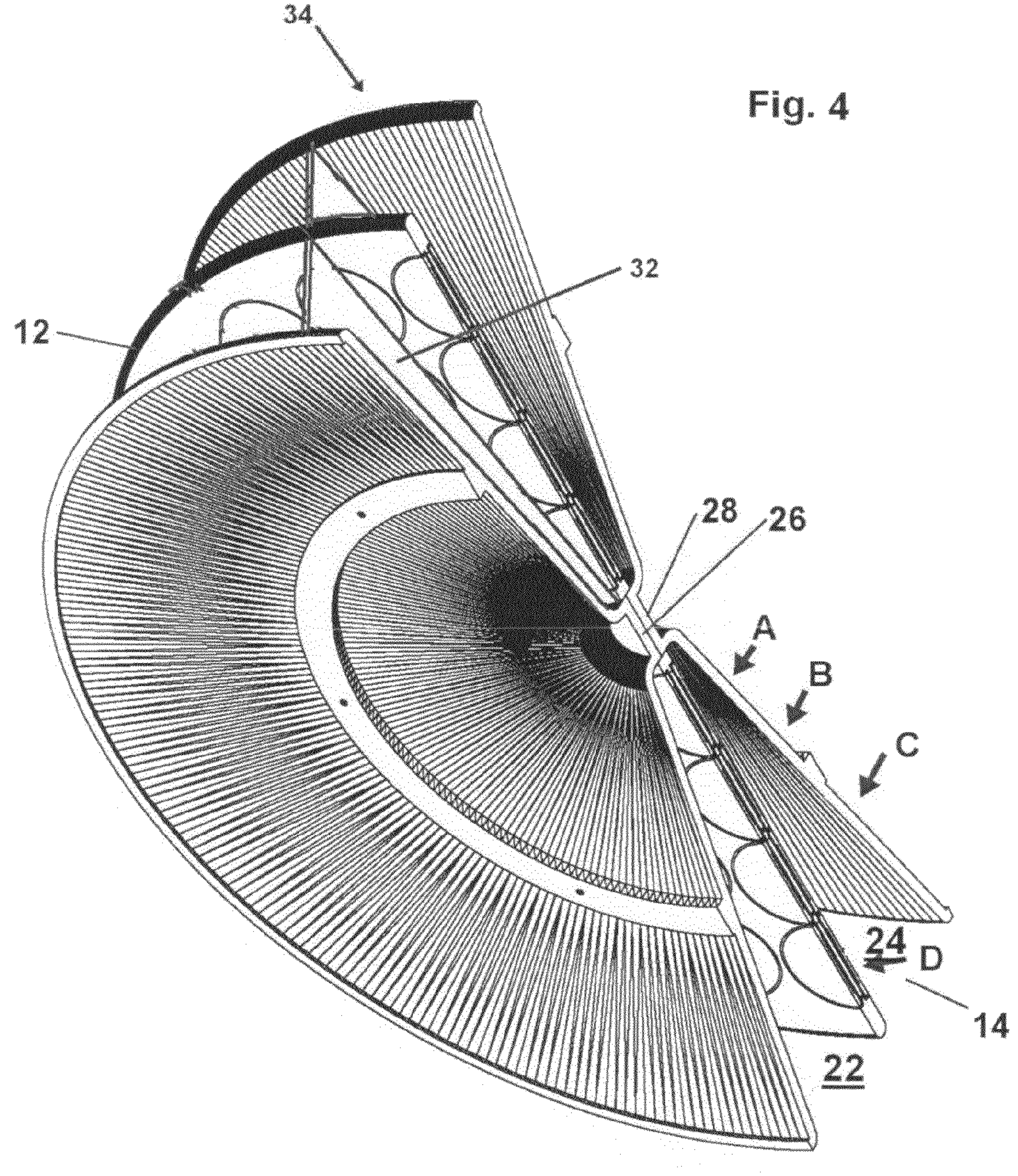
FIG. 4 is an isometric view of a sectioned omni-directional acoustic radiator with a radial baffle.

FIG. 4 illustrates the use of a radial baffle 32 to improve output gain of omni-directional acoustic radiators 10. Radial baffles 32 divide the toroidal waveguides 22, 24 into a plurality of radial channels 34. Greater amplitude gain is obtained if the toroidal waveguides 22, 24 are sectioned into a plurality of radial channels 34 using radial baffles 32. In FIG. 4 radial baffle 32 is shown extending from disk baffle 12 to the interior surfaces of the half shells 22, 24. FIGS. 5A-C show eight (optional) radial baffles 32 extending from a central core (here central core 26) to the outer edge perimeter of the disk baffle 12. The eight radial baffles 34 divide a toroidal waveguide into eight radial channels 34 resulting in improved amplitude output from the device, particularly for radial waveguides incorporating multi-transducer arrays with where transducers 17 are located in greater proximity to the outer edge of disk baffle 12.

FIG. 6 illustrates a possible alternative arrangement of arcuate transducers 117 mounted on a baffle 112. Here there are seven rings or circular arrays of transducers 117, with the transducers being closely tiled on the illustrated surface of the baffle 112 to effectively cover more of the surface of the baffle. It is expected that there will be an increasing number of transducers in each successive ring of transducers moving outwardly along the radiator. This assumes that the transducers used in the sub-arrays are identical, and in order to increase the active area of the transducers in step with the increasing area of the wave front it will be necessary to increase their number. However, it is more properly thought of as increasing the surface area of the transducers with each outward move along the radiator, not the number of transducers and to keep the proportional area of the circle along which energy is injected constant.

It is believed to be possible to insert more energy into the propagating sound wave, using the sub-array arrangement of transducers 17 and radiators 22 and 24, than could ever be achieved using a single transducer without incurring acoustic cavitation. It may be possible to support a cascade buildup of the acoustic wave, and maintain control over its spectrum, without incurring the sound pollution resulting from acoustic cavitation. To achieve this the innermost sub-array A is operated at relatively low level, with each successive sub-array B, C and D operating at higher energy input levels, but not at levels resulting in cavitation along their respective active surfaces. The continuous insertion of energy to maintain a constant or increasing signal amplitude, while it has particular advantages to the underwater application of the preferred embodiment, has application to radiator systems used in atmospheric applications. The increasing pressure of the sound wave itself may assist in the suppression of acoustic cavitation. The number of sub-arrays active (or present) can vary from one upward.

Piezoelectric devices have been commonly employed to construct acoustic transducers for use in sonar systems, particularly sonar system for use underwater. These devices develop electrical potential under changes in pressure which requires that the final stage amplifiers for the transducers be protected against feedback electrical power from an acoustic wave passing over a transducer.

Figure 7:
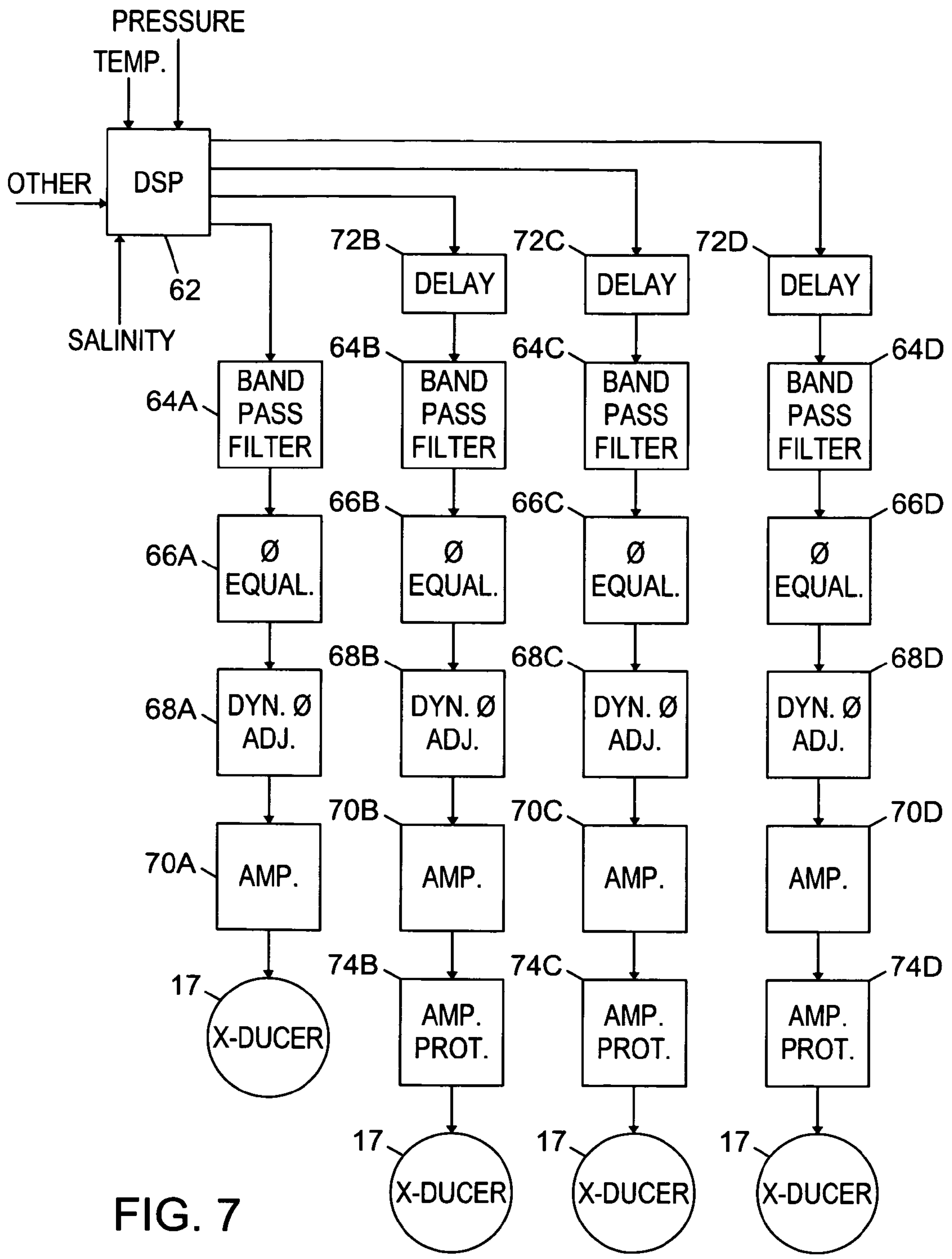
FIG. 7 is a block schematic of drive circuitry for the radiator.
Figure 8:
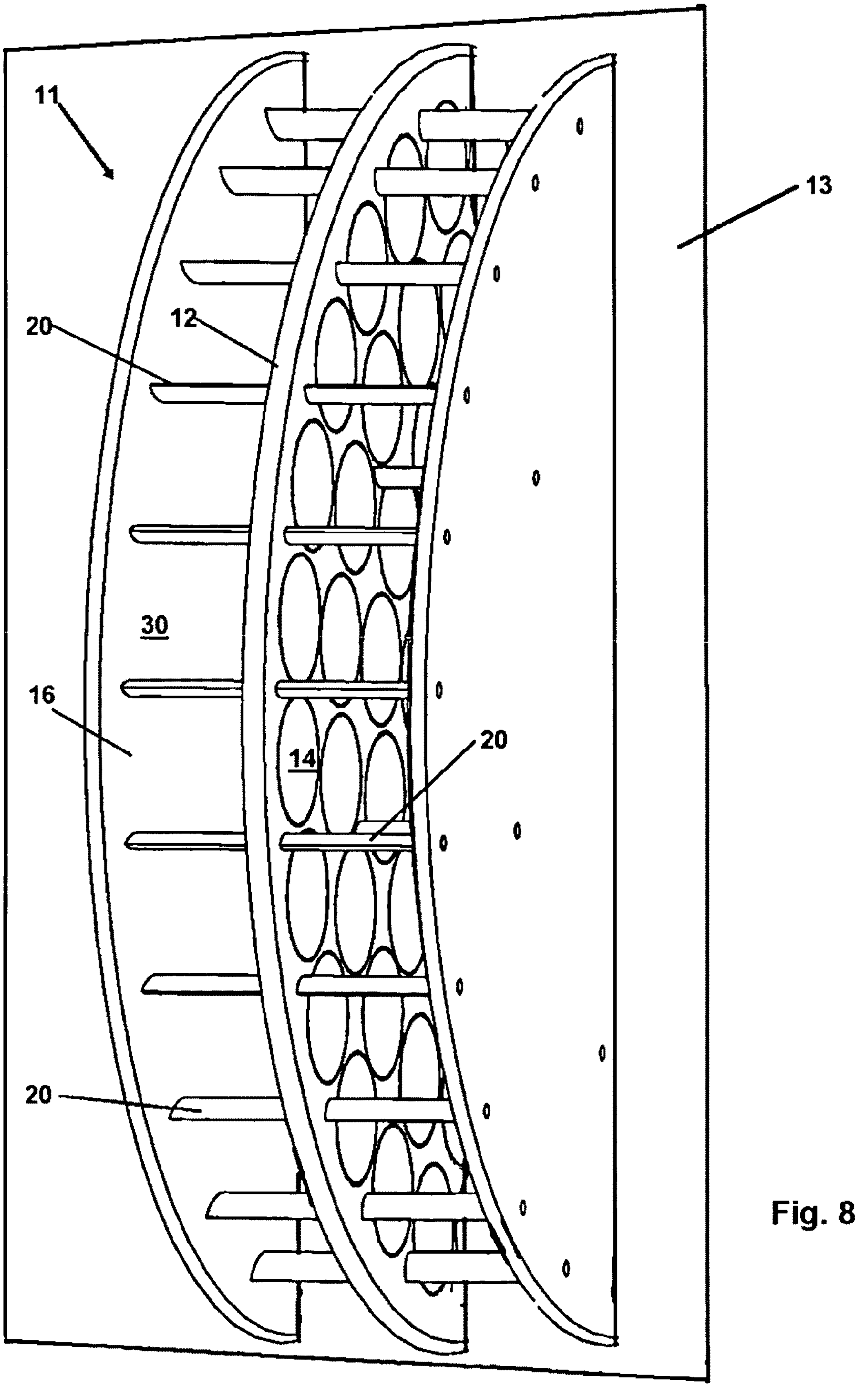
FIG. 8 is a perspective view of a section of a directional acoustic radiator with a back boundary.

Referring to FIG. 7, a block diagram circuit 60 illustrates a mechanism for control over a transducer array constructed from circular transducers 17. Block diagram circuit 60 is adapted for use of the system in a water environment, though its use in other liquid environments should not be discounted. A variety of factors must be taken into account in generating a high intensity underwater sound pulse, such as water depth (represented by pressure), salinity of the water and temperature of the water. All of the these factors affect water density and the speed of sound in water. In addition, other factors may be relevant to consideration of the possible onset of acoustic cavitation, such as the concentration of dissolved gasses, such as oxygen and nitrogen, in the water. Such measurements as are available (typically pressure, temperature and salinity) are provided a digital signal processor 62 which adjusts the base wave form for the four channels (A, B, C, D) and generates a delay factor for transmission to the three relatively outboard channels (B, C, D). The circuit channels correspond to the four sub-arrays A, B, C, D of transducers provided in the preferred embodiment. Final amplifier stages 70A-D provide differential levels of amplification depending upon the number of transducers in the sub-array (A-D). The omni-directional radiator 10 may also be operated as a highly directional receiver.

Channels A, B, C and D are schematically substantially identical save that channel A does not provide for delay of the base signal and may not require feedback protection for the final amplifier stage. Each channel includes a bandpass filter 64, an equalizer 66, dynamic phase adjustment 68 and final stage amplification 70. Channels B, C and D add delay elements 72 and amplification stage feedback protection 74.

Figure 9:
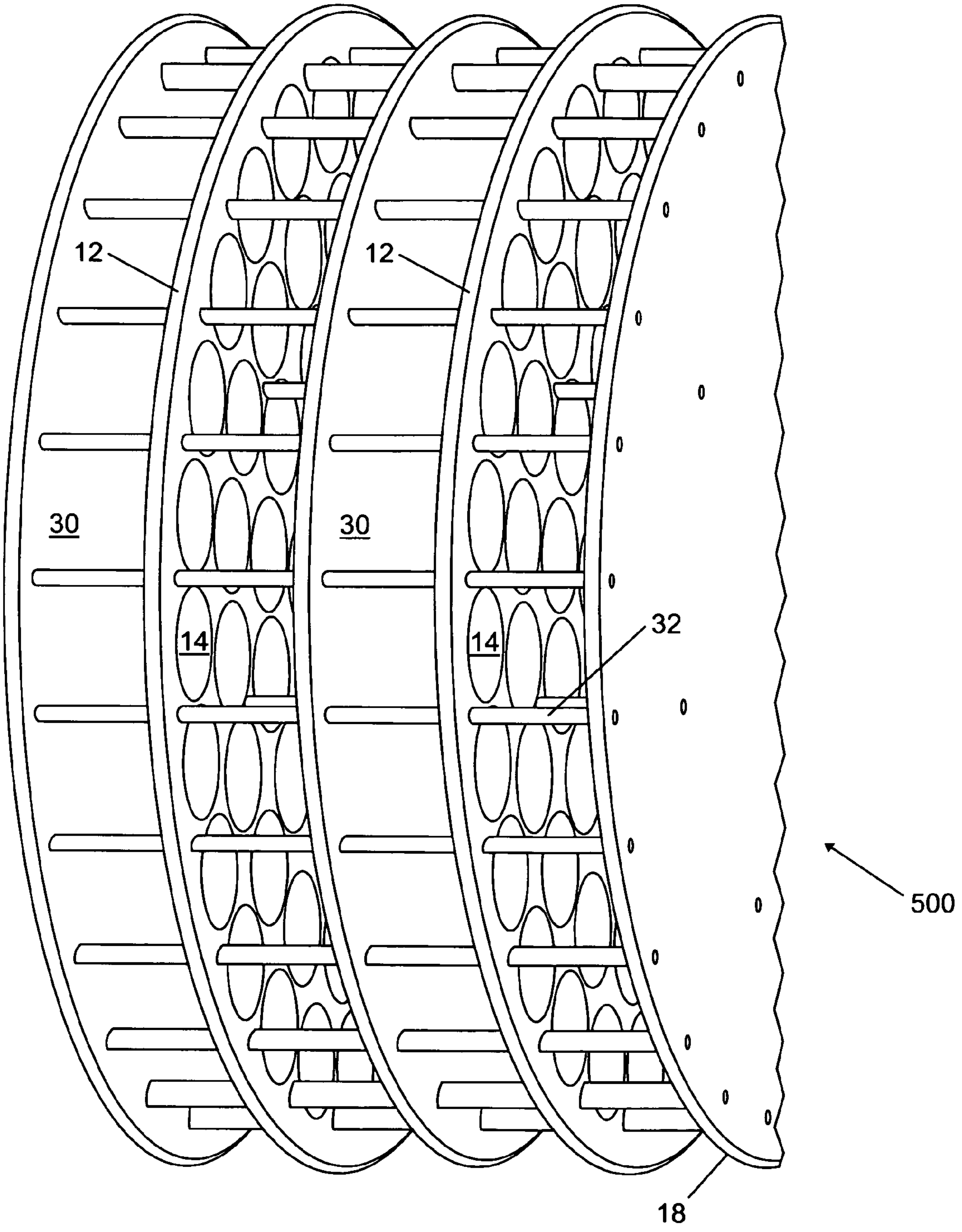
FIG. 9 is a perspective view of a section of acoustic radiators stacked in a linear array.

FIG. 9 illustrates stacking a pair of acoustic radiators 10 into a omni-directional line array 500. More than two acoustic radiators 10 can be stacked into the array. The stacks can be built from acoustic radiators including or not including radial baffles 32.

What is claimed is:

1. An acoustic radiator for suppression of cavitation in a liquid transmission medium, the acoustic radiator comprising:

an interior face;

an interior boundary located opposed to and spaced from the interior face;

a central core connecting the interior face to the interior boundary; and a plurality of submersible transducers distributed on the interior face and oriented to radiate sound away from the interior face against the interior boundary where the sound is contained and directed across the interior boundary and the interior face, the plurality of submersible transducers being organized into at least first and second sub-arrays, the second sub-array being located in succession to the first sub-array as determined by a primary local direction of propagation of the reflected sound.

2. The acoustic radiator of claim 1, further comprising a half shell and a disk baffle to support the interior boundary and the interior face, respectively, the half shell and the disk baffle defining a toroidal waveguide having a central core providing for globally omni-directional radiation of sound from the central core to a mouth and outwardly from the mouth.

3. The acoustic radiator of claim 2, wherein the interior face is one of first and second major surfaces of a disk baffle, with first and second interior boundaries opposing the first major surface and a second major surface of the disk baffle, respectively, and pluralities of submersible transducers being distributed on the first and the second major surfaces of the interior baffle in two toroidal waveguides.

4. The acoustic radiator of claim 2, including a plurality of toroidal waveguides stacked into a waveguide.

5. The acoustic radiator of claim 3, further comprising:

the submersible transducers being piezoelectric devices.

6. The acoustic radiator of claim 5, further comprising:

the successive sub-arrays of submersible transducers including greater numbers of transducers with increasing proximity to the mouth.

7. The acoustic radiator of claim 6, further comprising:

at least a first radial baffle extending to the mouth of the toroidal waveguides.

8. The acoustic radiator of claim 6, further comprising:

a plurality of radial baffles extending from the central core to the mouth dividing each toroidal waveguide into a plurality of signal channels within each toroidal waveguide.

9. An acoustic radiator comprising:

an arcuate mouth;

a waveguide extending from the mouth to a base, the waveguide being defined by first surface and a second opposed surface;

a plurality of water submersible acoustic transducers distributed along one of the first and the second opposed surface; and drive circuitry for the water submersible acoustic transducers for synchronously reinforcing a sound wave propagating along the length of the waveguide from the base to the arcuate mouth by operating those of the plurality of water submersible acoustic transducers on the first surface.

10. The acoustic radiator of claim 9, wherein the plurality of water submersible acoustic transducers reinforce the sound wave keeping a stable frequency spectrum.

11. The acoustic radiator of claim 10, further comprising:

the plurality of water submersible acoustic transducers being organized into sub-arrays defined by distance of the acoustic transducers in a sub-array from the arcuate mouth; and a ratio of the surface area of the water submersible acoustic transducers in any sub-array relative to the length of the arc of the sub-channel for the sub-array being a constant.

12. The acoustic radiator of claim 11, further comprising;

a second waveguide with water submersible acoustic transducers mounted in a baffle providing major surfaces for the first surface for both the first and second sound channels.

13. The acoustic radiator of claim 12, further comprising:

ring dampening elements positioned between the first and second surfaces of the sound channels.

14. An acoustic radiator comprising:

an arcuate waveguide, which may be extended through a full circle to form a toroidal waveguide;

the arcuate waveguide including first and second facing interior surfaces forming wave propagation boundaries;

a plurality of liquid submersible acoustic transducers arranged in a constellation along one of the first and second facing interior surfaces;

the plurality of liquid submersible acoustic transducers being oriented to direct sound at the remaining facing interior surface; and the waveguide terminating at a mouth.

15. The acoustic radiator of claim 14, further comprising:

radial baffles dividing the arcuate waveguide into radial channels.

16. The acoustic radiator of claim 15, including a plurality of toroidal waveguides stacked into a waveguide.

* * * * *